Aug. 24, 1948.    G. T. EIDSON    2,447,745
AUTOMATIC CHICKEN FEEDER
Filed Dec. 11, 1946

GREYBURN T. EIDSON
INVENTOR

BY *Herbert J. Brown*
ATTORNEY

Patented Aug. 24, 1948

2,447,745

UNITED STATES PATENT OFFICE 2,447,745

AUTOMATIC CHICKEN FEEDER

Greyburn T. Eidson, Irving, Tex., assignor of one-third to L. N. Moore and one-third to M. A. Phillips, both of Dallas, Tex.

Application December 11, 1946, Serial No. 715,553

3 Claims. (Cl. 119—55)

This invention relates to feeders, and has reference to a mechanism and construction whereby chickens and livestock may be fed over a relatively long period of time before replenishing the device.

An object of the invention is to provide a feeder of the referred to class which will protect the feed in the same from the weather and at the same time readily renders the feed accessible to the chickens or stock to be fed.

Another object of the invention is to provide a feeder for chickens and livestock which will prevent the feed from becoming scattered or wasted during its operation.

Particularly, the invention provides a mechanism whereby a feed trough door is efficiently opened and closed by the chickens or livestock to be fed.

These and other objects of the invention will become apparent from the following description of an exemplary form of the invention illustrated in the accompanying drawings, wherein.

Figure 1:
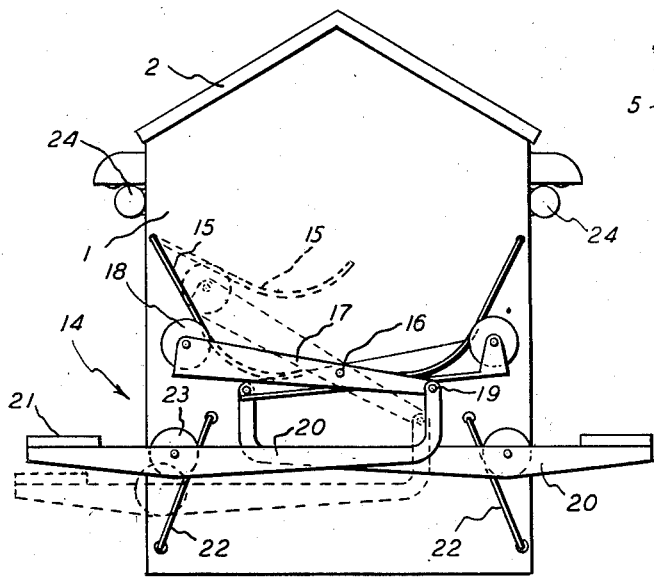
Figure 1 is an end elevational view of a chicken feeder, and particularly showing the mechanism for operating the feeder doors.
Figure 2:
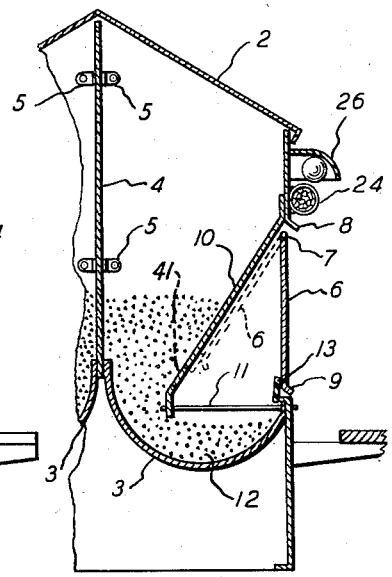
Figure 2 is a broken vertical sectional view, similar to Figure 1, and showing the inner parts of the feeder in their relative positions.

Accordingly, the form of the invention shown includes a rectangular housing 1 having a gabled roof 2. Within the housing 1 there are parallel horizontal feeding troughs 3 along the housing sides, and a frictionally engaged removable vertical partition 4 disposed between the said troughs. The partition 4 is slidably secured between opposing brackets 5 secured to the ends of the housing 1.

Hinged doors 6 are provided along each side of the housing 1 and are suspended by rods 7 secured to the upper edges of the said doors, and which rods are journaled in the ends of the housing 1. The edge of the housing 1 immediately above the door 6 is outwardly flanged, as at 8, to prevent rain or dust from entering the housing construction. Similarly, the lower edge of the door is outwardly flanged, as at 9, for the same reason. Inwardly of each door 6 and secured to the side walls of the housing 1 there are inwardly disposed baffles 10 which extend downwardly and into the troughs 3. The baffle 10 is further supported by a multiple of parallel crib rods 11 secured to the side wall of the housing 1 below the door 6, and to the lower edge of the said baffle. The crib rods 11 additionally provide means for preventing the chickens or stock from scattering the feed 12 when eating from the troughs 3.

Rubber cushions 13 are secured to the inner lower edges of each door 6 to contact the adjacent edge of the housing 1 when the door 6 is closed, and to provide a cushion against the baffle 10 when the door 6 is opened.

Figure 3:
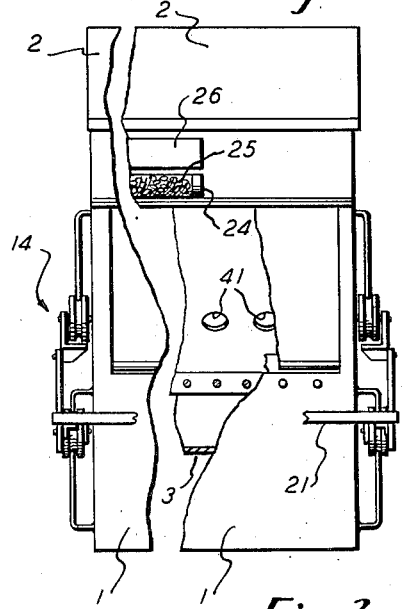
Figure 3 is a broken side elevational view of the feeder illustrated in Figure 1.

Each door 6 is provided with opening and closing mechanism 14 at each end thereof, and outwardly of the housing 1. An arcuate cam 15, in the form of a rod or the like, is secured to each end of each rod 7, the arcuate portion of which is directed downwardly and inwardly, as particularly shown in Figure 1. A central pivot rod 16 extends through the housing 1 and outwardly at each end where it supports lever arms 17. One end of each lever arm is provided with a grooved roller 18 for coaction with its cam 15, whereas, the other end of each lever arm is connected, by means of a pin 19, to a separate horizontal actuating arm 20. Each last referred to arm 20 is L-shaped, and it is the upper end of the leg of the same that is connected to its respective lever arm 17 by one of the pins 19. The extending outer ends of each pair of actuating arms 20 are provided with treadles 21 therebetween for operating the doors 6. Angularly disposed tracts 22 are secured to the ends of the housing 1, as shown in Figures 1 and 3, for coaction with rollers 23 mounted on the actuating arms 20.

Above each door 6, and secured to the outer wall of the housing 1, there is a transparent container 24 containing grain or other feed 25 for attracting the chickens or stock and causing them to place their weight on the treadle 21. A hooded light 26 may be provided above the transparent container 24 for operating the feeder in relatively dark places, such as the interior of barns, or for feeding at night.

Referring now to the operation of the feeder, the chicken or animal to be fed is attracted by the feed 25 in the transparent container 24, thus causing the chicken or animal to place its weight upon the treadle 21. The resulting downward movement of the actuating arm 20, which is guided by the track 22 and the roller 23 on the said arm, causes each lever arm 17 to move upwardly at its outer end. The action of each lever arm roller 18 on its cam 15 causes connected door 6 to open. The feed 12 within the trough 3 is then made accessible to the chicken or animal, and the parallel spaced crib bars 11 prevent the said feed from being scattered and wasted.

Openings 41 may be provided in the baffle 10 along its lower edge whereby the chicken or animal may reach through the same to agitate the feed 12, and thereby assure continuous flow into the trough 3.

When the chicken or animal removes its weight from the treadle 21 the weight of the door 6 closes the same, and at the same time the described operating mechanism 14 causes the treadle 21 to rise.

What is claimed is:

1. In a chicken feeder including a housing, a feed trough therein, and a door in the said housing providing access to the said trough, means for opening and closing the said door comprising a treadle outwardly of the said door, actuating arms supporting the said treadle, guide means on the said housing for coaction with the said arms, pivoted levers supported by the said housing and connected with the said arms, and cam means connected with the said door for coaction with the said levers whereby weight applied to the said treadle will open the said door, and whereby the weight of the said door will close the same when weight is removed from the said treadle.

2. In a chicken feeder including a housing, a feed trough therein, and a door in the said housing providing access to the said trough, means for opening and closing the said door comprising a treadle outwardly of the said door, actuating arms supporting the said treadle, angularly disposed guide means on the said housing, rollers on the said arms for coaction with the said guide means, pivoted levers supported by the said housing and connected with the said arms, and cam means connected with the said door for coaction with the said levers whereby weight applied to the said treadle will open the said door, and whereby the weight of the said door will close the same when weight is removed from the said treadle.

3. In a chicken feeder including a housing, a feed trough therein, and a door hinged along its upper edge and suspended in the said housing for providing access to the said trough, means for opening and closing the said door comprising a treadle outwardly of the said door, actuating arms supporting the said treadle, guide means on the said housing for coaction with the said arms, pivoted levers supported by the said housing and connected with the said arms, and cams secured to the said door for coaction with the said levers.

GREYBURN T. EIDSON.

REFERENCES CITED

The following references are of record in the file of this patent:

UNITED STATES PATENTS

| Number | Name | Date |
|---|---|---|
| 420,168 | Rogers | Jan. 28, 1890 |
| 421,465 | Woodworth | Feb. 18, 1890 |
| 1,548,720 | Lewis | Aug. 4, 1925 |
| 1,703,805 | Witham | Feb. 26, 1929 |
| 1,733,831 | Sommers | Oct. 29, 1929 |
| 1,878,555 | Uhrik | Sept. 20, 1932 |

FOREIGN PATENTS

| Number | Country | Date |
|---|---|---|
| 206,730 | Great Britain | Nov. 15, 1923 |